No. 858,201. PATENTED JUNE 25, 1907.
B. C. McCOY.
PLANTING MACHINE.
APPLICATION FILED OCT. 11, 1906.

4 SHEETS—SHEET 1.

WITNESSES
J. Nussbleth
C. R. Ferguson

INVENTOR
Bradley C. McCoy
BY Munn & Co
ATTORNEYS

No. 858,201. PATENTED JUNE 25, 1907.
B. C. McCOY.
PLANTING MACHINE.
APPLICATION FILED OCT. 11, 1906.

4 SHEETS—SHEET 2.

WITNESSES

INVENTOR
Bradley C. McCoy
BY
ATTORNEYS

No. 858,201. PATENTED JUNE 25, 1907.
B. C. McCOY.
PLANTING MACHINE.
APPLICATION FILED OCT. 11, 1906.
4 SHEETS—SHEET 3.
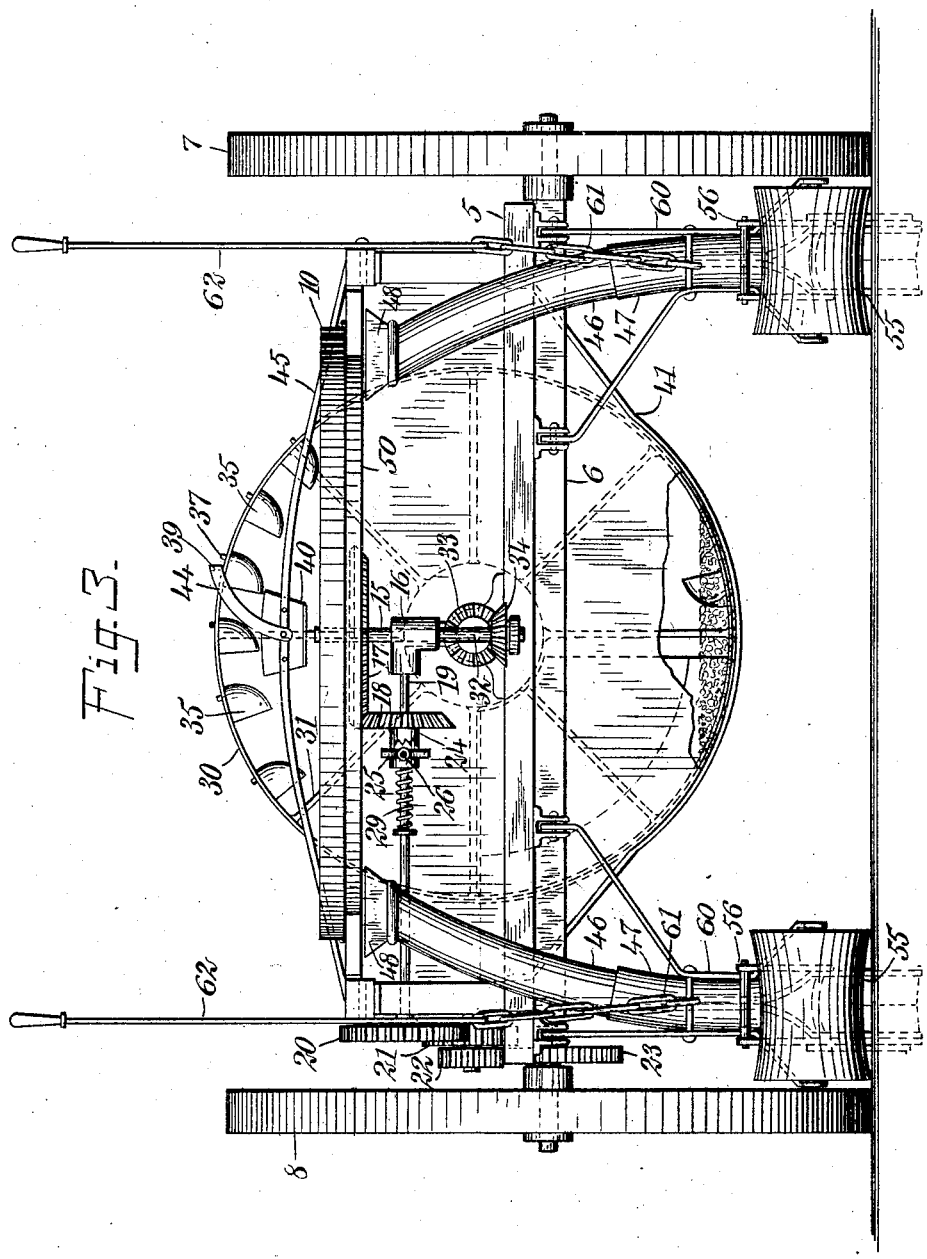
WITNESSES
INVENTOR
Bradley C. McCoy
BY Munn & Co
ATTORNEYS No. 858,201. PATENTED JUNE 25, 1907.
B. C. McCOY.
PLANTING MACHINE.
APPLICATION FILED OCT. 11, 1906.
4 SHEETS—SHEET 4.
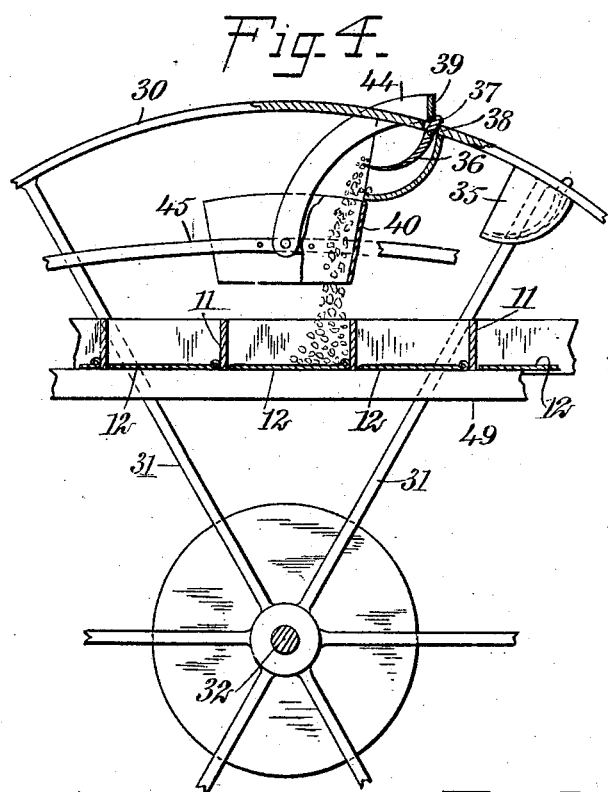
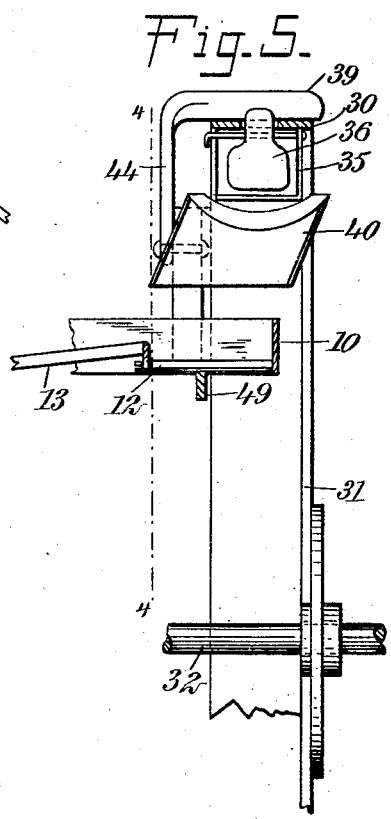
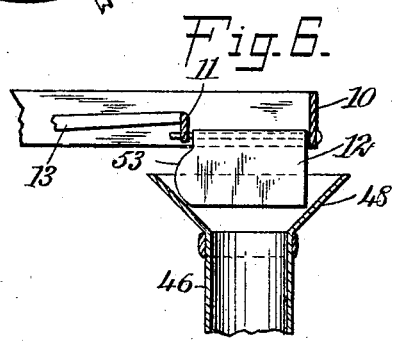
WITNESSES
INVENTOR
Bradley C. McCoy
BY
ATTORNEYS

UNITED STATES PATENT OFFICE.

BRADLEY CHARLES McCOY, OF PONTIAC, MICHIGAN.

PLANTING-MACHINE.

No. 858,201.     Specification of Letters Patent.     Patented June 25, 1907.

Application filed October 11, 1906. Serial No. 338,438.

*To all whom it may concern:*

Be it known that I, BRADLEY CHARLES McCOY, a citizen of the United States, and a resident of Pontiac, in the county of Oakland and State of Michigan, have invented a new and Improved Planting-Machine, of which the following is a full, clear, and exact description.

This invention relates to improvements in machines for planting seed-potatoes, corn, beans, or the like, an object being to provide a practically automatic machine, by means of which two rows may be planted at a time, with the planting or hills at uniform distances apart, and in which the seeds are—before planting—at all times in view of the person on the planter, so that should a pocket in the carrying device not contain sufficient seed, more material may be manually placed therein.

I will describe a planting machine embodying my invention and then point out the novel features in the appended claims.

Reference is to be had to the accompanying drawings forming a part of this specification, in which similar characters of reference indicate coresponding parts in all the figures.

Figure 1:
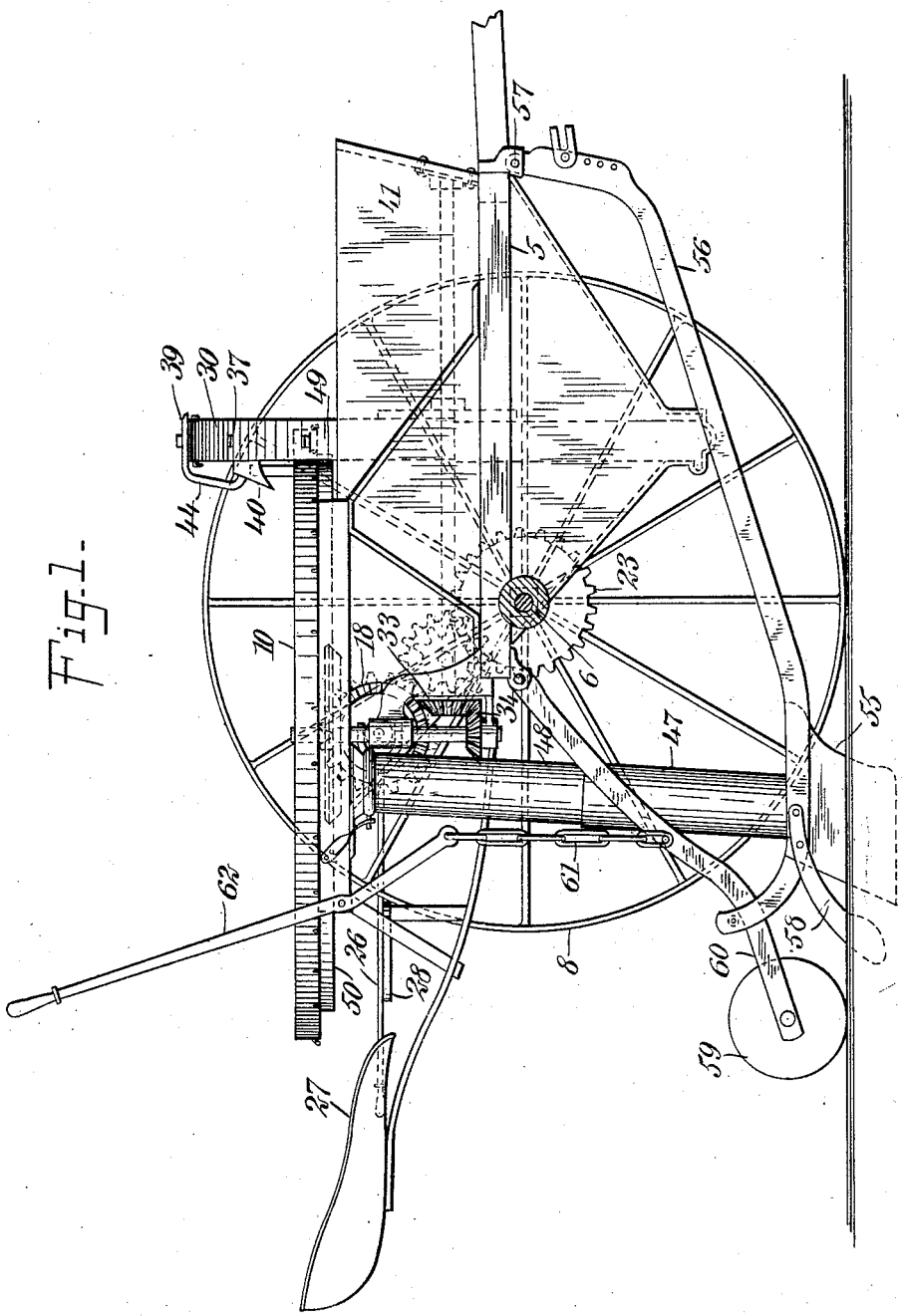
Figure 2:
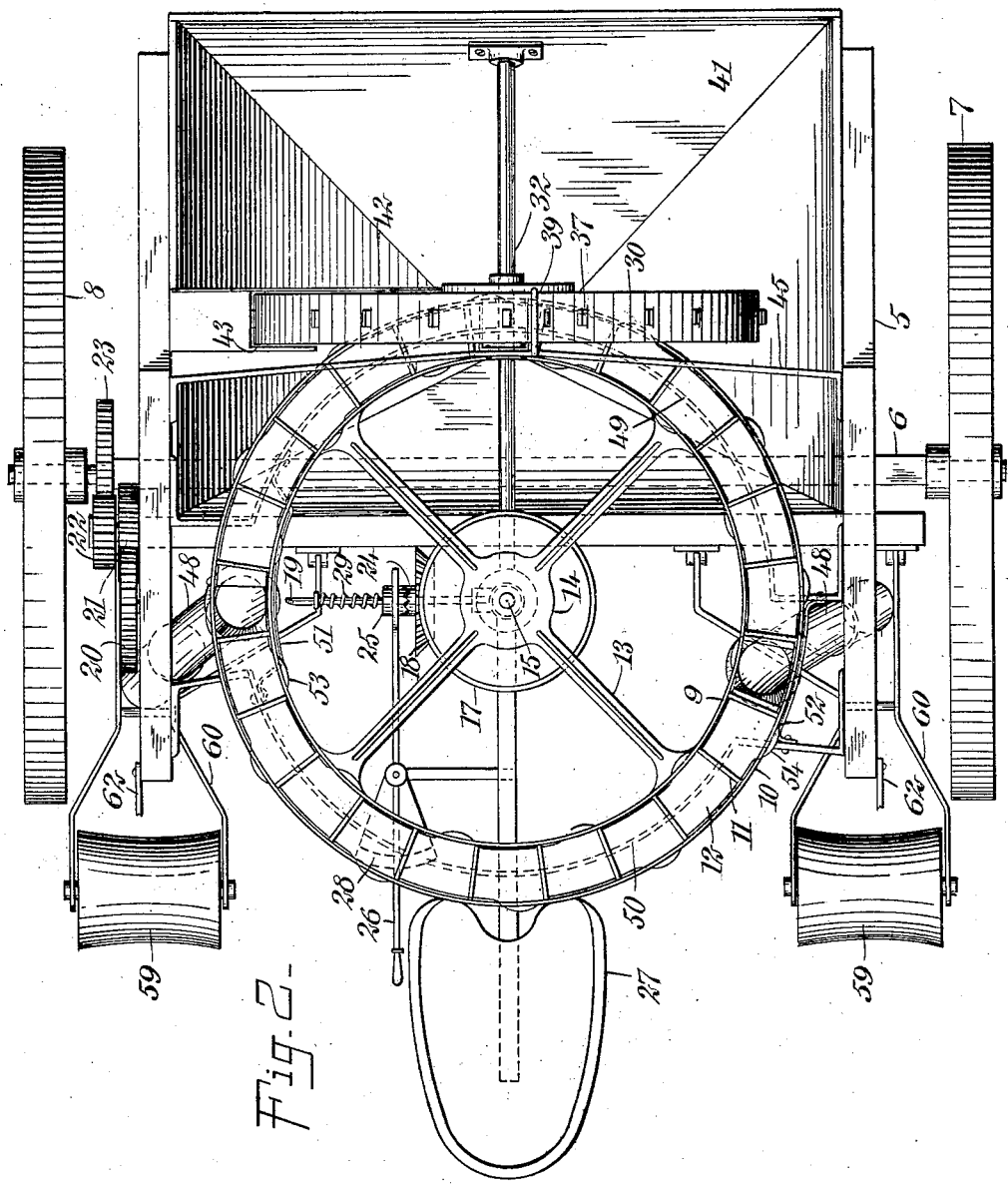

Figure 1 is a side elevation partly in section of a planting machine embodying my invention; Fig. 2 is a plan thereof; Fig. 3 is a rear elevation; Fig. 4 is a fragmentary view of the seed feeding mechanism partly in section on the line 4—4 of Fig. 5; Fig. 5 is a side view thereof; and Fig. 6 is a sectional detail showing the position of parts when discharging seed from the carrier.

Referring to the drawings, 5 designates the frame of the planter, mounted on an axle 6 supported by traction wheels 7, 8. Mounted to rotate in a horizontal plane on the machine is a seed carrier which is substantially in the form of a wheel having an inner rim 9 and an outer rim 10, and these rims are connected by transverse partitions 11 forming the end walls of seed pockets in which the seeds are deposited by means of a feed wheel to be hereinafter described. Each pocket has a downwardly swinging bottom plate 12, which plates are alternately released to deposit seed at opposite sides of the machine as will be hereinafter described.

The carrier has spoke connections 13 with a hub 14 mounted on a vertical shaft 15 having bearings in a block 16, and on the shaft 15 is a bevel gear 17 meshing with a bevel pinion 18 loosely mounted on a counter-shaft 19, having at its inner end a bearing in the block 16 and provided at its outer end with a gear wheel 20 meshing with another gear wheel 21 on the shaft of which is a pinion 22 engaging with a gear-wheel 23 attached to the hub of one of the traction wheels here shown as the wheel 8; therefore it will be seen that rotary motion is imparted to the carrier from said traction wheel.

The pinion 18 has a clutch member 24 for engaging with a clutch member 25 slidably mounted on the shaft 19 but adapted to rotate therewith. When it is not desired to rotate the carrier, the clutch member 25 may be moved out of engagement with the clutch member 24 by means of a lever 26 which extends rearward to a point near the driver's seat 27, and it may be held by engaging the lever with a segment rack 28.

The clutch member 25 is held yieldingly toward the clutch member 24 by means of a spring 29 surrounding the shaft 19 and engaging at one end with said clutch member 25 and at the other end with a collar fixed on the shaft.

The seed-potatoes or other seeds are fed to the pockets of the carrier by means of a feeding-wheel consisting of a rim 30 having spoke connections 31 with a forwardly extending shaft 32 on the rear end of which is a bevel pinion 33 meshing with a bevel pinion 34 on the lower end of the shaft 15; therefore it will be seen that the carrier and feeding device will be operated in unison. The feeding device or wheel carries a plurality of scoops corresponding to the number of pockets in the carrier device; these scoops are indicated at 35, and in each scoop is arranged to swing, an ejecting plate 36 which corresponds approximately to the curvature of the scoop, while each ejecting plate has a finger 37 projected through an opening 38 in the band or ring 30 and adapted to engage with a trip bar 39 which will tilt the ejecting plate and cause the seed to be discharged into a chute 40, and from this chute the seed passes into a pocket of the carrier.

The feeding device operates in a hopper 41 in which the potatoes or other seeds are placed. The four walls of the hopper are downwardly convergent so that the seed will pass readily to the bottom of the hopper, to be carried up by the scoops at the lower portion of the hopper passing between the guides 42, 43. The trip bar 39 is extended transversely of the feed wheels from an arm 44 pivoted to a cross-bar 45, so that each projected finger 37, after the tripping operation, may pass underneath said tripping arm.

At opposite sides of the machine and adapted to receive seed from the pockets of the carrier are spouts for directing seed to the furrow for planting. Each spout consists of telescopic sections 46, 47, which have swinging connection with the frame of the machine; the object in making the spouts telescopic is so that the lower portion 47 may move upward and downward in passing over irregular surfaces of the ground. The upper end of each spout is funnel-shaped as indicated at 48, and arranged on the frame of the machine underneath the carrier are two opposite segmental tracks 49, 50, which are designed to hold the bottom plates of the pockets closed until the pockets reach the place of discharge over the tubes. It is clearly shown in Fig. 2 that there is a space between the adjacent ends of the segmental tracks, this space being over said spouts. At one side, a short segmental track 51 is connected to the first-named segmental tracks, the said short track extending along the inner side of the rim 9 of the carrier. At the opposite side is a similar short track 52 which, however, is arranged along the outer side of the outer rim 10. Alternating bottom plates have inwardly-extended lugs 53 for engaging with the short track 51 to hold the swinging bottoms in closed position when passing over the first tube. The other swinging bottoms have lugs 54 extended from the outer edges for engaging with the short track 52 to hold the bottoms of the pockets closed, the said pockets having deposited the seed in the first tube. By this arrangement it is obvious that the seed will be dropped from one of the pockets into the first tube, and that the seed of the following pocket will be deposited in the second tube. If it is only desired to plant one row, a short track section may be arranged between the adjacent ends of the track sections 49, 50, at one side.

Arranged forward of each dropping tube is a plow point 55; these plow points being designed to cut furrows in the ground, and they are supported in the rear portions of frames 56 having swinging connection 57 with the main frame of the machine; and supported by frames 56 rearward of the plow points are covering blades 58 for forcing the wet or damp earth into the channels to cover the seed; and rearward of these covering blades are rollers 59 for packing the earth over the seed. These rollers 59 are mounted in frames 60 having swinging connection with the main frame of the machine and the frames 56 it will be noted have upwardly-extended rear portions provided with pins for engaging on the upper sides of the frames 60 so that the frames 56 and 60 may be raised or lowered together as occasion may require.

As a means for raising and lowering the frames, the said frames 60 have chain connections 61 with levers 62 pivoted to the main frame of the machine and adjacent to the seat 27 for the driver.

From the foregoing description the operation of the machine, it is thought is made clear, but it may be well to briefly state the operation. The potatoes are carried by the scoops from the hopper and deposited in the pockets of the horizontally rotating carrier and as a pocket rises at a position over the first tube, the bottom wall thereof will swing downward as indicated in Fig. 6, permitting the seed to drop into said tube but the bottom wall of the next pocket however, will be held closed until it reaches the opposite tube, when it opens and discharges the seed into the second tube. The seed, of course, will drop into the furrows dug by the plow points, and as before mentioned, dirt will be scraped over and upon the seed by means of the covering blades 58, and the dirt will be packed by the rollers 59.

When the machine is not in use, or in traveling from place to place, the clutch member 25 will be moved out of engagement with the clutch member 24, and therefore the feed-wheel and the carrying-wheel will remain idle, and of course, the frames carrying the plow points and the rollers may be lifted upward by means of the hand levers 62.

Having thus described my invention, I claim as new and desire to secure by Letters Patent:—

1. A planting machine comprising a wheel-mounted body, a hopper carried by the body, a feeding device extended into the hopper, means for rotating said feeding device, a rotary carrier for receiving seed from the feeding device, and means for directing the seed from the carrier to the ground.

2. A planting machine comprising a wheel-mounted body, a hopper supported on the body, a feeding device mounted to rotate in the hopper, scoops carried by the feeding device, ejecting devices arranged in the scoops, means for operating the ejecting devices, and a rotary carrier for receiving material from the feeding device.

3. A planting machine comprising a wheel-mounted body, a hopper connected to the body, a feeding device comprising a wheel arranged to rotate in the hopper, scoops carried by the wheel, a carrier mounted to rotate at right-angles to the feeding device and having a plurality of pockets and swinging bottom plates for said pockets.

4. A planting machine comprising a wheel-mounted body, a hopper arranged in the body, a feeding device comprising a wheel mounted to rotate in the body, gear connections between said feeding device and one of the supporting wheels of the machine, a carrier mounted to rotate at right-angles to the feeding device, and having driving connection with said supporting wheel, the said carrier having a plurality of pockets, swinging bottom plates for said pockets, tubes at opposite sides of the machine, for receiving material from the pockets, and means for releasing the swinging bottom plates of the pockets alternately at opposite sides of the machine.

5. A planting machine comprising a wheel-mounted body, a hopper attached to the body, a wheel mounted to rotate in the hopper, scoops carried by the wheel, the rim of said wheel having openings, ejecting plates mounted to swing in the scoops and having projections passing through said openings, a device for engaging with said projections to rock the plates, and a carrier provided with pockets for receiving material discharged from the scoops.

6. A planting machine comprising a wheel-supported body, a hopper arranged in the body and having its several walls downwardly convergent, a feed-wheel mounted to rotate in the hopper, means for rotating said feed-wheel, a carrier arranged to rotate in a horizontal plane and having a plurality of pockets, swinging bottom plates for the pockets, segmental tracks for normally holding said bottom plates in closed position, the adjacent ends of said segmental tracks being spaced apart, tubes mounted in the machine and having their upper ends within said spaces, and means for releasing said bottom plates to discharge material alternately into the opposite tubes.

7. A planting machine comprising a wheel-mounted body, a hopper arranged in said body, a carrier mounted to rotate in a substantially horizontal plane, the said carrier having a plurality of pockets, a rotary part at right angles to the carrier for discharging material from the hopper into said pockets, tubes extended downward and adapted to receive material from the pockets of the carrier, and plow points arranged forward of the lower ends of said tubes.

8. A planting machine comprising a wheel-mounted body, a hopper arranged in the body, a carrier on the body, means for rotating the said carrier in a substantially horizontal plane, a rotary part at right angles to the carrier for discharging seed from the hopper into said carrier, downwardly extended tubes at opposite sides of the machine, for receiving seed from the carrier, plow points forward of the lower ends of said tubes, plates rearward of the lower ends of said tubes and rollers rearward of said plates.

9. A planting machine comprising a wheel-mounted body, a hopper arranged in the body, a carrier mounted to rotate in a horizontal plane on the body, a scoop carrying wheel for discharging seed from the hopper into said carrier, tubes extended downward from the machine at opposite sides and adapted to receive seed from the carrier, each tube consisting of telescopic sections, furrow cutting devices forward of the lower end of said tubes, and covering devices rearward of said tubes.

10. A planter comprising a frame, supporting wheels for said frame, a hopper arranged in the frame, the said hopper having four walls downwardly convergent, guide boards in the lower portion of the hopper, a feed wheel movable in the hopper, and between said guide boards, scoops carried by the wheel, ejecting plates mounted to swing in the scoops, and a rotary carrier for receiving material from the scoops.

11. A planting machine comprising a frame, wheels on which the frame is mounted, a hopper carried by the frame, a carrier mounted to rotate in a substantially horizontal plane, and having a plurality of pockets, means for discharging seed from the hopper into said pockets, segmental track members, swinging bottom plates for the pockets held normally closed by said track members, the two track members being spaced apart one from the other at the ends, a short track member arranged at the outer side of the space at one side of said segmental track members, a short track member arranged along the inner side of the space at the opposite side of the segmental track members, lugs extended outward from the swinging bottom plates of certain of the pockets, lugs extended inward from the other swinging bottom plates and alternating with the first-named plates, the outwardly extended lugs being adapted for engagement with the outer short track members while the inwardly extended lugs are designed for engagement with the inner short track members, and tubes carried by the machine for receiving seed from the pockets.

12. A planter comprising a wheel mounted frame, a rotary carrier on said frame, a hopper, a rotary part carrying scoops for discharging seed from the hopper onto said carrier, tubes leading downward and adapted to receive seed from the carrier at opposite sides of the machine, plow points having swinging connection with the frame, the said plow points being forward of the lower ends of the tubes, covering plates rearward of the tubes and having swinging connection with the frame, and rollers rearward of said plates, said rollers also having swinging connection with the frame.

13. A planting machine comprising a frame, wheels on which the frame is mounted, seed-feeding devices mounted to rotate in the frame, a seed-carrying device mounted to rotate on the frame, its axis being at right-angles to the feeding device, and means for directing seed from the carrying device to the ground.

In testimony whereof I have signed my name to this specification in the presence of two subscribing witnesses.

BRADLEY CHARLES McCOY.

Witnesses.
WILLIAM F. NORTH,
THOMAS HOOPER.